(12) United States Patent
Cotto

(10) Patent No.: US 7,029,198 B1
(45) Date of Patent: Apr. 18, 2006

(54) GRADING RAKE

(75) Inventor: Micheal E. Cotto, Barnstable, MA (US)

(73) Assignees: Michael E. Cotto, Barnstable, MA (US); John D. Bambara, Hyannis, MA (US)

( * ) Notice: Subject to any disclaimer, the term of this patent is extended or adjusted under 35 U.S.C. 154(b) by 0 days.

(21) Appl. No.: 10/092,082

(22) Filed: Mar. 6, 2002

Related U.S. Application Data

(60) Provisional application No. 60/280,041, filed on Mar. 30, 2001.

(51) Int. Cl.
*A01D 7/02* (2006.01)

(52) U.S. Cl. .............. 404/75; 14/76; 14/92; 56/400.01; 56/400.02

(58) Field of Classification Search .......... 404/81, 404/92, 75, 76; 56/400.01, 400.07, 400.21, 56/400.18, 400.19; 7/114; 15/236.01; 172/371, 172/378; D8/13
See application file for complete search history.

(56) References Cited

U.S. PATENT DOCUMENTS

| | | | | | |
|---|---|---|---|---|---|
| 123,369 | A | * | 2/1872 | Stearns | 56/400.01 |
| D23,660 | S | * | 9/1894 | Gibbs | D8/13 |
| 567,129 | A | * | 9/1896 | Gibbs | 56/400.01 |
| 678,519 | A | * | 7/1901 | Robinson | 172/373 |
| 951,024 | A | * | 3/1910 | Parker | 56/400.11 |
| 1,276,915 | A | * | 8/1918 | Hinkle | 56/400.16 |
| 1,481,148 | A | * | 1/1924 | Preuss | 172/378 |
| D146,226 | S | * | 1/1947 | Mader | D8/13 |
| 2,574,932 | A | * | 11/1951 | Nohl | 56/400.01 |
| 2,855,746 | A | * | 10/1958 | Miller, Sr. | 56/400.19 |
| D209,660 | S | * | 12/1967 | Lind | D30/162 |
| 3,838,474 | A | * | 10/1974 | Erickson | 15/142 |
| 3,850,541 | A | * | 11/1974 | Baillet et al. | 404/114 |
| D246,153 | S | * | 10/1977 | Insalaco | D8/13 |
| 4,063,407 | A | * | 12/1977 | Tansey | 56/400.14 |
| 4,173,835 | A | * | 11/1979 | Burrell | 37/285 |
| 4,270,614 | A | * | 6/1981 | Judy | 171/63 |
| 4,351,145 | A | * | 9/1982 | Farkas | 56/400.16 |
| D271,936 | S | * | 12/1983 | Fyffe et al. | D8/14 |
| 4,970,853 | A | * | 11/1990 | Greene, III | 56/400.01 |
| 5,142,855 | A | * | 9/1992 | Guidarelli | 56/400.16 |
| 5,161,360 | A | * | 11/1992 | Hill | 56/400.17 |
| 5,414,982 | A | * | 5/1995 | Darnell | 56/400.19 |
| 5,417,044 | A | * | 5/1995 | Russo | 56/400.11 |
| D389,024 | S | * | 1/1998 | Jensen, Jr. | D8/10 |
| 5,775,080 | A | * | 7/1998 | Reithel | 56/400.07 |
| D427,495 | S | * | 7/2000 | Lee, Jr. | D8/13 |
| 6,131,381 | A | * | 10/2000 | Milbury | 56/400.17 |
| 6,158,202 | A | * | 12/2000 | Jung | 56/12.7 |
| 6,199,358 | B1 | * | 3/2001 | Majkrzak | 56/400 |

* cited by examiner

*Primary Examiner*—Raymond Addie
(74) *Attorney, Agent, or Firm*—Daly,Crowley,Mofford &Durkee,LLP

(57) ABSTRACT

A grading rake having a handle and a rake head, and having stiff but bendable, flexible polymer tines in the rake head, with the tines angled back toward the handle, and with the end of the tines truncated and parallel to the plane of the handle and rake head.

24 Claims, 4 Drawing Sheets

GRADING RAKE

CROSS-REFERENCE TO RELATED APPLICATIONS

This application claims the benefit under 35 U.S.C. §119(e) of prior U.S. Provisional Application No. 60/280,041 filed Mar. 30, 2001; all of which is hereby incorporated by reference.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

Grading rakes are typically employed by landscapers to spread topsoil evenly, generally prior to applying grass seed. The grading rake is used by pushing the head of the rake over the soil to level the soil and then by pulling the rake toward the user to pull or remove rocks, roots, twigs and the soil debris from the leveled soil.

Grading rakes presently in use comprise a handle and a traverse head section with spaced apart metal tines composed of cast aluminum or wood.

In such use, the tines wear down rapidly and the tines of the grading rake often break or bend when the tines strike rocks or other soil debris.

It is desirable to develop an improved grading rake which will be easily manufactured and which overcomes the disadvantages of prior art grading rakes.

BRIEF SUMMARY OF THE INVENTION

The invention relates to a grading rake having stiff but flexible polymeric tines which bend but do not break in normal use.

The invention comprises a grading rake which comprises an elongated handle and a traverse head with spaced apart tines secured to the head and a holder means to connect the one lower end of the handle to the head, such as a cast aluminum, solid triangular plate, or other holder means. The rake tines are formed of a stiff but flexible polymeric material, for example cylindrical nylon, and which tines have a length of about 2½–4 inches, a diameter of about ¼–½ inch, and which tines are uniformly spaced apart on the head from about ½–1½ inches.

The polymer material is solid, or may be a cellular material, but is stiff and capable of flexing at one end in use without breaking or permanently deforming, e.g., flexing ½–1 inch or more at the one end, while the other end is secured in the rake head.

The traverse rake head may be a generally solid cylindrical shape of wood with tine holes drilled therein and therethrough for the insertion of one end of the tines. The tines are inserted in the holes to the other side of the rake head and generally flush with the head surface and then fastened in place by screws, nails or adhesives, or a combination thereof. This arrangement provides for the tines to be securely held in the rake head (typical diameter of 1–2 inches) and provides that individual tines may be easily replaced, if required.

In a preferred embodiment the free raking end of the polymer tines are truncated, so that the surface end is a plane generally parallel to the area to be raked and to the plane of the rack handle and rake head. The tines are prepared from a solid cylindrical spool of nylon with one end cut square and the other cut to an angled flat surface, e.g., 30–60 degrees from the axis of the tine and parallel to the plane formed by the handle and rake head.

The lower end of the handle is secured to the rake head by a securing means. In one embodiment, the securing means comprises a cast aluminum, solid triangular piece with an outer arcuate shape adapted to fit about the rake head and to be fastened in position. The rear of the securing means comprises an extended hollow piece of square cross-section adapted to receive and hold the lower or forward end of the handle securely in place with the handle end fastened therein. This arrangement, unlike the prior art use of individual extended supports, provides a solid support for the rake head. The handle is secured to the rake head so that the handle is perpendicular to the axis of the rake head.

The invention will be described for the purpose of illustration only in connection with certain illustrated embodiments. However, it is recognized that various changes, modifications, additions, and improvements may be made in the illustrative embodiments without departing from the spirit or scope of the invention.

BRIEF DESCRIPTION OF THE DRAWINGS

The character of the invention, however, may be best understood by reference to one of its structural forms, as illustrated by the accompanying drawings in which.

DETAILED DESCRIPTION OF THE INVENTION

Figure 1:
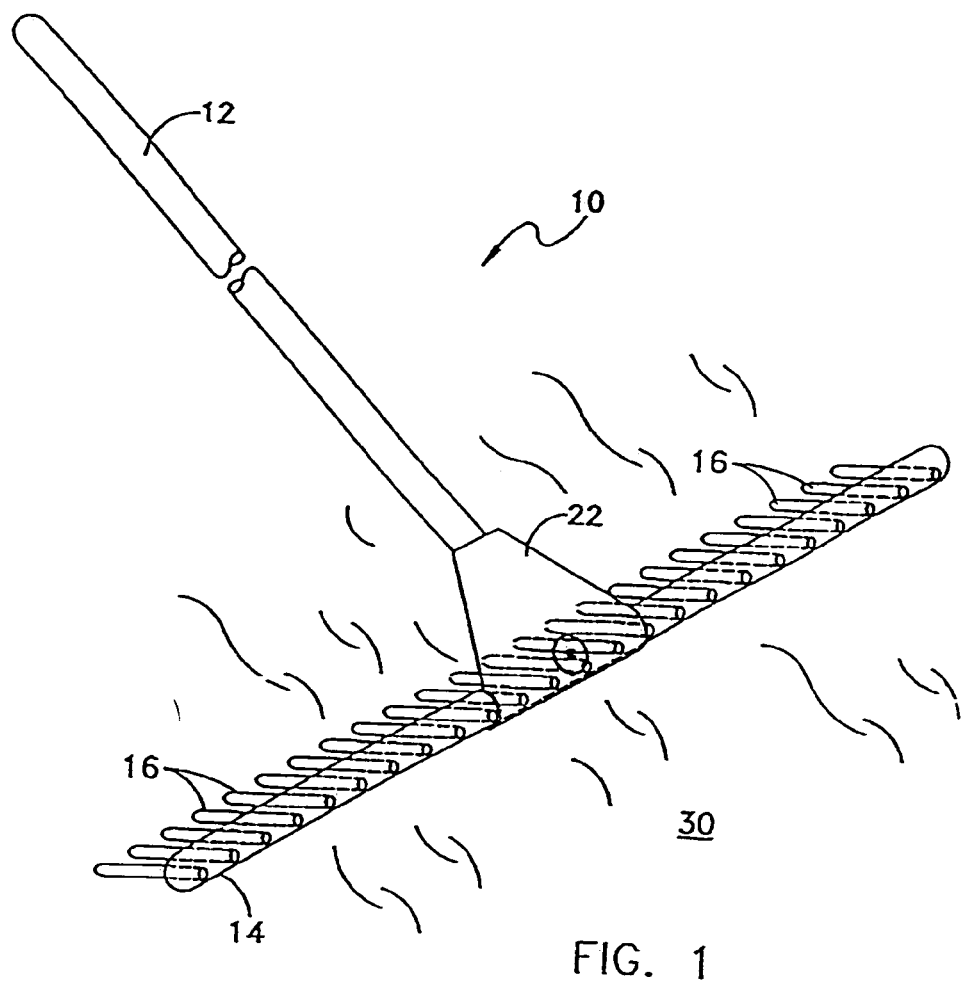
FIG. 1 is a perspective view of the grading rake of the invention.

The drawings, and particularly FIG. 1, illustrate a grading rake 10 embodying the invention and adapted to grade soil 30. The rake 10 has an elongated wooden handle 12 with one end secured in a cast aluminum, solid triangular holder 22. The holder 22 has a front arcuate curve 24. The handle holder 22 secures the lower end of the handle 12 by containing the lower end in a back handle holder cavity 32. The arcuate curve 24 of the holder 22 surrounds a cylindrical wooden rake head 14 and is fastened to the cylindrical wooden rake head 14 with one or more fasteners 26.

The traverse rake head 14 carries a plurality of solid nylon tines 16, which flex and wear evenly and are uniformly spaced apart and extending downwardly and rearwardly, in the general direction of the handle, from the rake head. The upper end of each tine 16 is positioned in a hole 28 in the rake head 14, and releasably secured in the rake head 14 by fastener nails 20.

The tines may be formed of nylon or other tough and flexible material. the material may be reinforced and/or modified with fiberglass, carbon fiber, abrasion resistant fillers, or similar compositing materials.

The free end of each tine is truncated to 45° from the axis of the tine, while the handle through the securing holder has a similar angle to the tines. The truncated surface of each tine is parallel to the plane formed by the handle 12 and the rake head 14.

Figure 2:
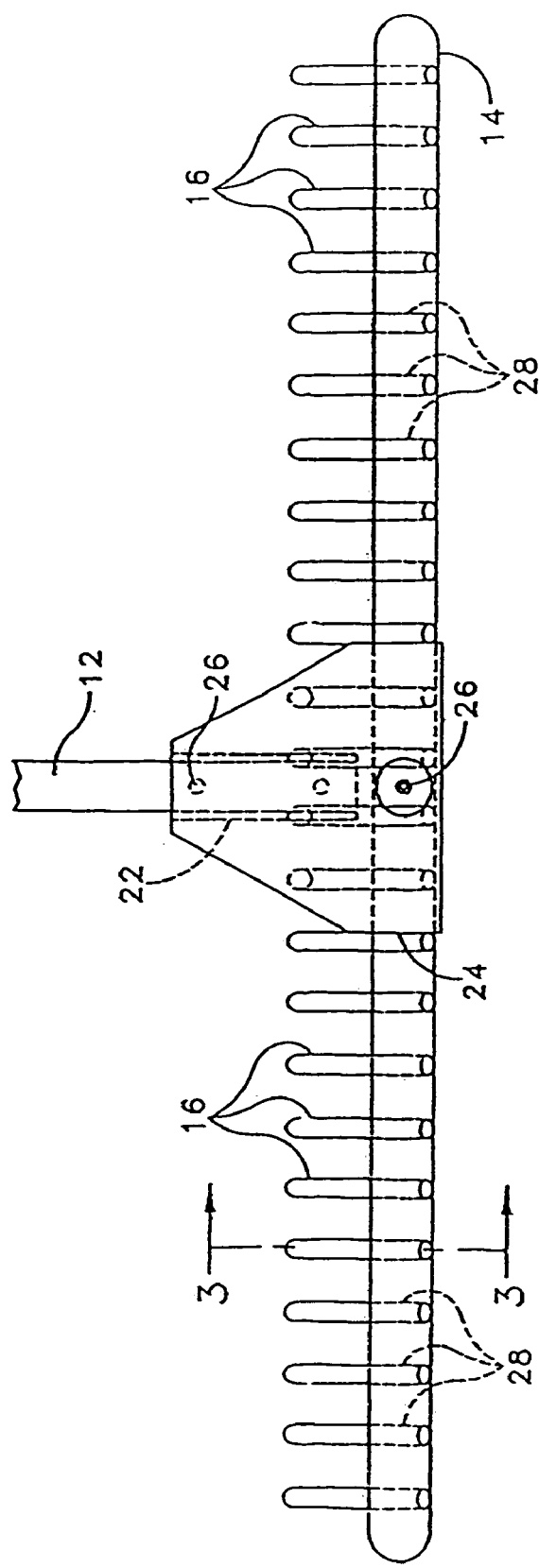
FIG. 2 is an enlarged front plan view of the rake head of FIG. 1.
Figure 3:
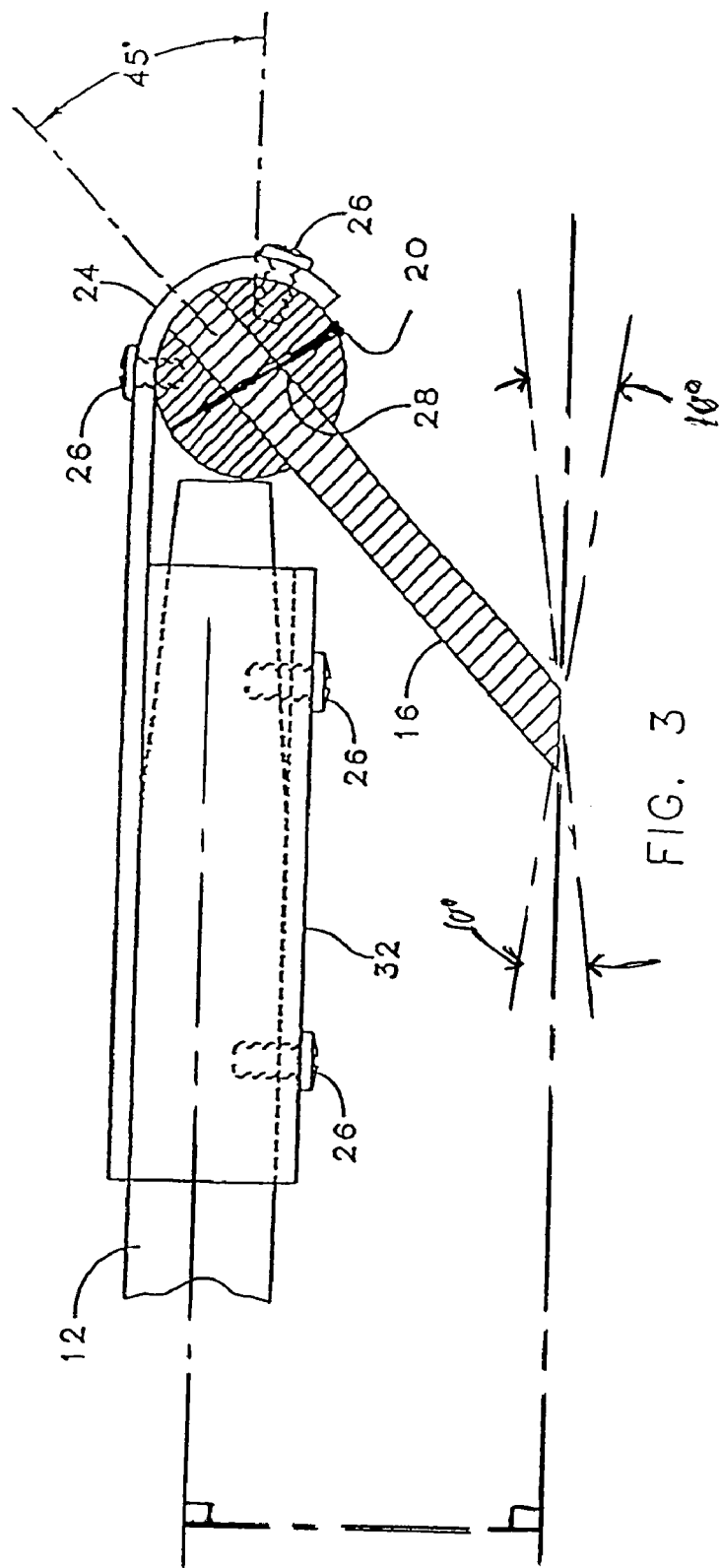
FIG. 3 is a sectional view along lines 3—3 of FIG. 2.
Figure 4:
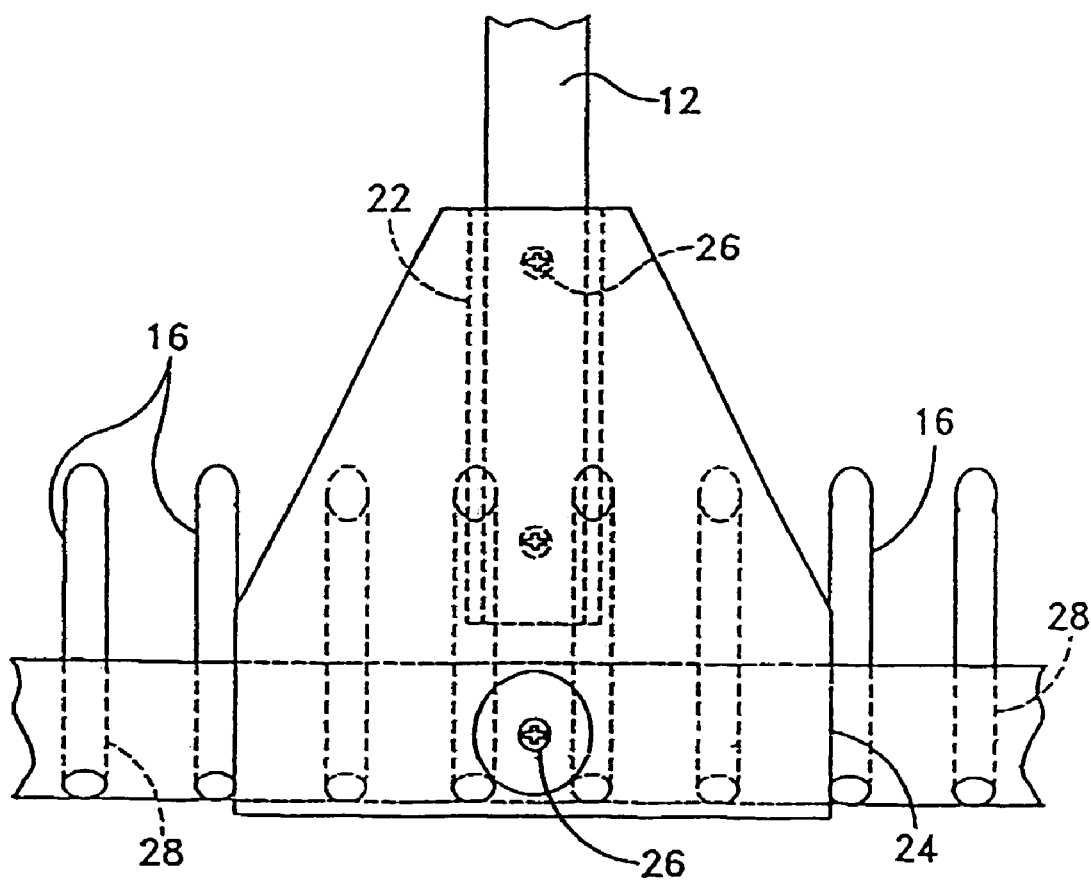
FIG. 4 is a further enlarged front plan view of the rake head of FIG. 1.

In particular, FIG. 2 shows the front view of the rake head, while FIG. 3 illustrates, in a cross-sectional view through the rake head 14, how the individual tines 16 are secured in the holes 28 in the rake head 14. Removal of fastener nails 26 permits individual tines 16 to be easily withdrawn, replaced, and refastened in position.

The grading rake of the invention as described provides for a rake in which the tines are not broken or bent in use, provides easy replacement of the tines, and a sturdy connection holder to secure the handle and rake head.

The ideal angle between the handle and plane of the tines is about 45 degrees, with 30 to 60 degrees being desired, and with 40 to 50 degrees being preferred. The ideal angle between the free end surface of the tines and the plane of the handle and the rake head is about zero, with −10 to +10 degrees being desired, and with −5 to +5 degrees being preferred. The ideal angle between the free end surface of the tines and axis of the tines is about 45 degrees, with 30 to 60 degrees being desired, and with 40 to 50 degrees being preferred.

The preferred use of the grading rake is the grading of particulate matter containing certain undesirable relatively large particles, such as soil which contains rocks and sticks. In essence, the user pushes the rake head forward across to particulate matter to smooth the surface of the matter, the backwardly directed tines and their truncated horizontal free end surface ride on top of the material, thereby spreading the material and unifying and smoothing it upper surface. Then, the user draws the rake head back so that the rear edge of the free end of the rearward directed tines engages large particles in the material, lift the large particle up onto the tines and elevate and separate the large particles from the material. The large particles can then be segregated from the particulate matter. In this way, the upper surface of the material can be graded, smoothed, and given the desired uniform fine texture.

What is claimed:

1. A grading rake, comprising:
   a handle having a first and a second end;
   a holder secured to the second end of the handle;
   an elongate rake head secured in a fixed position in relation to the handle by the holder; and
   a plurality of linear tines extending from the rake head for grading particulate matter, wherein an interior angle between the plurality of tines and the handle is fixed and ranges from about thirty degrees to about sixty degrees;
   wherein the plurality of tines include a truncated end surface forming an angle with a longitudinal axis of the handle ranging from about plus ten degrees to negative ten degrees.

2. The grading rake according to claim 1, wherein the rake head is substantially cylindrical.

3. The grading rake according to claim 1, wherein the truncated end surfaces of the tines are substantially parallel with the handle.

4. The grading rake according to claim 1, wherein the truncated end surfaces of the tines form an angle with an axis of the tines ranging from about thirty to about sixty degrees.

5. The grading rake according to claim 1, wherein the holder includes an arcuate curve complementing a surface of the elongate rake head.

6. The grading rake according to claim 5, further including at least one fastener for securing the rake head to the holder.

7. The grading rake according to claim 1, wherein the plurality of tines extend through holes in the rake head.

8. The grading rake according to claim 6, further including a plurality of fasteners for releasably securing the plurality of tines to the rake head.

9. The grading rake according to claim 1, wherein the plurality of tines are substantially cylindrical.

10. The grading rake according to claim 9, wherein the plurality of tines have a diameter ranging from about 0.25 to about 0.5 inch.

11. The grading rake according to claim 1, wherein the plurality of tines are uniformly spaced apart from about 0.5 to about 1.5 inch.

12. The grading rake according to claim 1, wherein the plurality of tines are formed from a stiff but flexible polymer.

13. The grading rake according to claim 12, wherein the polymer includes nylon.

14. The grading rake according to claim 12, wherein the plurality of tines flex about 0.5 to about 1 inch at a free end with respect to an end secured by the rake head without breaking.

15. A grading rake, comprising:
    a handle having a first end and a second end;
    a holder secured to the second end of the handle;
    a substantially cylindrical rake head substantially perpendicularly secured to the handle by the holder; and
    a plurality of tines extending from holes in the rake head having respective truncated end surfaces, wherein an interior angle between the plurality of tines and the handle ranges from about thirty degrees to about sixty degrees and an angle between the truncated end surfaces and the handle ranges from minus ten degrees and positive ten degrees.

16. The grading rake according to claim 15, wherein the truncated end surfaces are substantially parallel to the handle.

17. The grading rake according to claim 15, wherein the truncated end surfaces form an angle with respective tine axes ranging from about thirty degrees and about sixty degrees.

18. The grading rake according to claim 15, wherein the plurality of tines extend from holes formed through the rake head.

19. The grading rake according to claim 18, further including removable fasteners for securing the plurality of tines.

20. The grading rake according to claim 15, wherein the plurality of tines are formed from a stiff but flexible polymer material that is stiff and capable of flexing at a free end without permanently deforming.

21. The grading rake according to claim 20, wherein the plurality of tines flex from about 0.5 inch to about 1 inch at the free end with respect to an end secured by the rake head without breaking.

22. The grading rake according to claim 15, wherein the plurality of tines are substantially cylindrical having a diameter ranging from about 0.25 inch to about 0.5 inch.

23. The grading rake according to claim 22, wherein the plurality of tines include nylon.

24. A method of grading particulate matter, comprising:
    pushing particulate matter with a grading rake; and
    pulling the particulate matter with the grading rake such that cylindrical nylon tines extending from a rake head flex from about 0.5 inch to about 1 inch at a free end such that the tines separate relatively large particles from smaller particles, wherein a truncated end surface of the tines travels across a surface of the particulate matter,
    wherein the truncated end surfaces form an angle with a handle of the grading rake ranging from about positive ten degrees and minus ten degrees, and the plurality of tines form an interior angle with a handle of the rake ranging from about thirty degrees to about sixty degrees.

* * * * *